(12) United States Patent
Johnson et al.

(10) Patent No.: US 8,153,354 B2
(45) Date of Patent: Apr. 10, 2012

(54) SEALED CELL STRUCTURE

(75) Inventors: Mark Thomas Johnson, Eindhoven (NL); Martinus Hermanus Wilhelmus Maria Van Delden, Eindhoven (NL); Dirk Jan Broer, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 416 days.

(21) Appl. No.: 12/438,185

(22) PCT Filed: Aug. 17, 2007

(86) PCT No.: PCT/IB2007/053280
§ 371 (c)(1),
(2), (4) Date: Feb. 20, 2009

(87) PCT Pub. No.: WO2008/023309
PCT Pub. Date: Feb. 28, 2008

(65) Prior Publication Data
US 2010/0015557 A1 Jan. 21, 2010

(30) Foreign Application Priority Data
Aug. 21, 2006 (EP) .................................. 06119267

(51) Int. Cl.
*G03F 7/20* (2006.01)
(52) U.S. Cl. ......... 430/320; 430/321; 430/322; 430/325
(58) Field of Classification Search .................... None
See application file for complete search history.

(56) References Cited

U.S. PATENT DOCUMENTS

| 6,750,844 | B2 | 6/2004 | Nakanishi | |
|---|---|---|---|---|
| 6,950,226 | B2 | 9/2005 | Endo et al. | |
| 2002/0188053 | A1 | 12/2002 | Zang et al. | |
| 2005/0231795 | A1 | 10/2005 | Martins et al. | |
| 2006/0049380 | A1* | 3/2006 | Sha et al. | 252/299.7 |
| 2007/0254208 | A1* | 11/2007 | Kurt et al. | 429/126 |

FOREIGN PATENT DOCUMENTS

| JP | 2004294716 A | 10/2004 |
|---|---|---|
| WO | 2004008238 A1 | 1/2004 |
| WO | 2004111716 A1 | 12/2004 |

OTHER PUBLICATIONS

English-language abstract of KR 2005038106 A (Apr. 2005).*
Flexible Microcup® EPD by RTR processes, Presentation Prepared for IMI 2rd Paper-Like Displays Conference St. Pete Beach, Florida, SiPix Imaging Inc, R&D: 1075 Montague Expressway, Milpitas, CA 95035, Manufacturing: 47485 Seabridge Dr., Fremont, CA 94538, (Feb. 2005).

* cited by examiner

*Primary Examiner* — John A. McPherson
(74) *Attorney, Agent, or Firm* — Larry Liberchuk

(57) ABSTRACT

A method for forming a sealed cell structure is disclosed. The sealed cell structure comprises first (10) and second (12) substrates that are spaced apart by a plurality of partition walls (14). The partition walls define a plurality of cells (18, 19) between the first and second substrates. At least one of the substrates and the partition walls have a layer (16, 22, 30) of photo-embossing material on them. A latent image is written (112) onto the photo-embossing material, and then the image is developed, thereby causing expansion of the photo-embossing material in the areas (114) according to the pattern of the latent image. The expansion of the photo-embossing material causes the cells to be sealed apart from one another.

20 Claims, 6 Drawing Sheets

SEALED CELL STRUCTURE

This invention relates to an improved method for creating a sealed cell structure. The invention is applicable to devices comprising multiple sealed cells, and in particular to electrophoretic displays.

The sealed cell structures considered by this invention comprise two substrates that are spaced apart by a plurality of partition walls, the partition walls separating the volume between the two substrates into cells.

Such sealed cell structures are commonly used to form electrophoretic displays. The cells of the structure may be used to form display pixels, by filling the cells with electrophoretic fluid comprising movable charged particles. The movable charged particles within each cell may then be moved using electric fields, to give a variety of different display effects. For an example of an electrophoretic display device, the reader is referred to Applicant's International Patent Application WO 2004/008238.

One of the primary problems associated with forming sealed cell structures, is the difficulty of ensuring an adequate seal between the cells of the structure. For example, a known manufacturing method for forming a sealed cell structure having first and second substrates spaced apart by a plurality of partition walls, comprises starting with the first substrate, then forming a plurality of partition walls on the first substrate, and then laying the second substrate over the partition walls. However, in practice there are often unintentional gaps that remain between the second substrate and the tops of some of the partition walls, resulting in imperfect sealing between the cells. In electrophoretic displays, migration of charged particles from one cell to another cell can occur via these gaps, and this can cause very serious errors in the image displayed by the cells.

A known method for sealing the cells apart from one another comprises forming partition walls on a first substrate and then filling the cells defined by the partition walls with a fluid mixture comprising an electrophoretic fluid and a sealing fluid, wherein the sealing fluid has a lower density than the electrophoretic fluid. Next, a second substrate layer is laid on top of the partition walls, and then the sealing fluid is cured, which, due to its low density, forms a layer between the second substrate layer and the electrophoretic fluid, thereby sealing the cells apart from one another.

One of the problems with this method is that the electrophoretic fluid may become contaminated with the sealing fluid, which may in turn cause undesired effects such as agglomeration or loss of charge of the particles, or undesired sticking of the particles to surfaces. Such effects may result in a deterioration in the quality of the display.

Another problem associated with this method is that some of the electrophoretic particles can become trapped within the sealing layer, reducing the transparency of the sealing layer, and hence the brightness of the display.

U.S. Pat. No. 6,950,226 discloses a variation on this method, whereby part of the sealing layer is cured before it is brought into contact with the electrophoretic fluid, hence reducing the number of electrophoretic particles that become trapped in the sealing layer. However, this requires additional processing and alignment steps for realising the uncured portion of the layer in alignment with the partition walls.

It is therefore an object of the invention to provide a sealed cell structure that improves on the prior art solutions.

According to a first aspect of the invention, there is provided a method for forming a sealed cell structure, the sealed cell structure comprising first and second substrates and a plurality of partition walls, the method comprising:

forming photo-embossing material on at least one of:
the first substrate;
the second substrate; and
the plurality of partition walls;
spacing the first and second substrates apart by the plurality of partition walls, thereby defining a plurality of cells between the first and second substrates;
writing a latent image into the photo-embossing material; and
developing the latent image, causing the photo-embossing material to be displaced so as to seal the cells apart from one another.

Accordingly, there is provided a sealed cell structure that provides an effective degree of sealing between cells. Hence, the sealed cell structure may be used to form pixels of an electrophoretic display by filling the cells with electrophoretic fluid prior to sealing them, the seals being sufficient to prevent significant migration of the charged particles of the electrophoretic fluid between the cells.

Furthermore, the sealed cell structure does not cause significant numbers of charged particles to become trapped during the sealing process, thereby minimising any reductions in the brightness of the display.

Advantageously, since the sealing method comprises displacing photo-embossing material to the areas where it is needed to form the seals, the volume of the cells (and hence the fluid pressure within them), may be substantially the same after the sealing process as before the sealing process. This helps reduce the chances of the cells rupturing during or after the sealing process.

Additionally, there is no requirement for a sealing fluid to be mixed with the electrophoretic fluid, and so contamination of the electrophoretic fluid is avoided in this respect.

Advantageously, the writing of the latent image may comprise exposing areas of the photo-embossing material to actinic light, thereby defining the areas of the photo-embossing material to which some of the photo-embossing material should be displaced during the development of the latent image.

Furthermore, the development of the latent image may comprise heating the photo-embossing material, thereby raising the mobility of particles of the photo-embossing material, and causing the particles to diffuse (displace) according to the pattern of the latent image. Hence, the areas of the photo-embossing material that the particles diffuse to may expand to seal the cells apart from one another.

Advantageously, the photo-embossing material may comprise a polymer, a monomer, and a photo-initiator. The latent image may be written by exposing areas of the material to actinic light, the actinic light forming locally reactive particles by photo-disassociation of the photo-initiator. Then, the latent image may be developed by heating the photo-embossing material, causing the monomer to diffuse (displace) towards the exposed areas of the photo-embossing material, thereby expanding the exposed areas to seal the cells apart from one another.

Additionally, the photo-embossing material may also comprise a thermal initiator. The thermal initiator may cause polymerisation of the photo-embossing material after the photo-embossing material is heated above a certain temperature. This polymerisation may be performed as part of the development of the photo-embossing material, in order to halt further displacement of the photo-embossing material after the photo-embossing material has been displaced to an extent sufficient to seal the cells apart from one another. This results in a fully cured, and thus mechanically and chemically stable composite material.

Additionally, the photo-embossing material may also comprise a inhibitor that retards the polymerisation below a critical concentration of reactive particles. Hence, areas of the photo-embossing material that were un-intentionally exposed to low intensity stray actinic light, resulting in a relatively low concentration of reactive particles, may be inhibited from polymerisation. This may enhance the contrast between areas of the photo-embossing material that were exposed and the areas of the photo-embossing material that were not exposed during the writing of the latent image. Advantageously, the latent image may be written onto the photo-embossing material after the first and second substrates have been spaced apart by the partition walls. Hence, the substrates and partition walls do not have to be spaced in alignment with respect to a previously written latent image, thereby simplifying the step of spacing the substrates apart by the partition walls.

Furthermore, the cells may be filled with a fluid that comprises particles for absorbing the actinic light. These light absorbing particles may act as a mask that at least partially defines the pattern of the latent image that is written on the photo-embossing material. Hence, the latent image may effectively be self-aligning and self-patterning with respect to the cell structure.

Alternatively, the latent image may be written onto the photo-embossing material before the first and second substrates are spaced apart by the partition walls. This may simplify the process of writing the latent image, since the photo-embossing material may be more easily accessed.

Advantageously, the step of spacing the first and second substrates apart by a plurality of partition walls may comprise the steps of forming the partition walls on the first substrate, and laying the second substrate on the partition walls. This may enable the partition walls to be built up from the first substrate, simplifying the creation and/or placement of the partition walls between the substrates.

Advantageously, the photo-embossing material could be formed as a (substantially uniform) layer on at least one of the first and second substrates. This has the advantage that the placement of the photo-embossing material on the substrate(s) does not have to be aligned with respect to the partition walls.

Alternatively, the photo-embossing material could be formed on at least one of the first and second substrates, within the regions of the interfaces between the partition walls and the at least one of the first and second substrates. This may enable the areas of the substrate(s) that are outside the regions of the interfaces with the partition walls, to be substantially free of photo-embossing material, possibly improving the transparency of the cell, and/or reducing unwanted reflections that could occur due to interfaces between the substrate and photo-embossing layer. This may also help to reduce the chances of particles sticking to the photo-embossing material.

Advantageously, the photo-embossing material could be formed on the partition walls, within the regions of the interfaces between the partition walls and at least one of the first and second substrates. This may again enable the areas of the substrate(s) that are outside the regions of the interfaces with the partition walls, to be substantially free of photo-embossing material, having the same advantages as outlined directly above.

Furthermore, the photo-embossing material could be placed on both the partition walls and on at least one of the first and second substrates. Hence, at an interface between a substrate and a partition wall, the photo-embossing materials on the substrate and partition wall, may both expand towards and come into contact with one another, thereby sealing the interface. This may enable a stronger seal to be formed, since in this case the photo-embossing material forms the seal by contacting other photo-embossing material, rather than by contacting a substrate or partition wall of a different material to the photo-embossing material. Additionally, having two areas of photo-embossing material that both expand towards one another, may enable wider gaps between the partition walls and the substrates to be filled.

Advantageously, in the case where the plurality of partition walls are formed on the first substrate, the photo-embossing material may be formed on the second substrate, prior to the laying of the second substrate on the partition walls. Then, the writing and developing of the latent image may cause the photo-embossing material on the second substrate to be displaced so as to expand towards and to contact the plurality of partition walls, thereby sealing the cells apart from one another.

Furthermore, in the case where the plurality of partition walls are formed on the first substrate, the photo-embossing material may be formed on the first substrate, prior to the forming of the partition walls on the first substrate. Then, the writing and developing of the latent image may cause the photo-embossing material on the first substrate to be displaced so as to press against the plurality of partition walls, thereby displacing the plurality of partition walls so as to contact the second substrate, and thereby sealing the cells apart from one another. This has the advantage that the second substrate does not have to be processed with the photo-embossing material.

Advantageously, in the case where the plurality of partition walls are formed on the first substrate, the photo-embossing material may be formed on the partition walls, within the regions that will form the interfaces between the partition walls and the second substrate. Then, the writing and developing of the latent image may cause the photo-embossing material on the partition walls to be displaced so as to expand towards and to contact the second substrate, thereby sealing the cells apart from one another. This may enable the areas of the second substrate that are outside the regions of the interfaces with the partition walls, to be substantially free of photo-embossing material, possibly improving the transparency of the cell, and/or reducing unwanted reflections that could occur due to interfaces between the substrate and photo-embossing layer. This may also help to reduce the chances of particles sticking to the photo-embossing material.

The steps of writing and developing the latent image may take place during overlapping time periods. This may simplify the process, and may effectively enable the writing and developing of the latent image to be performed in a single manufacturing step.

Advantageously, the photo-embossing material may comprise an inner photo-embossing material in which the latent image is written and developed, and an outer protective layer at the surface of the inner material. The outer protective layer has the capability to deform in accordance with the inner material during the development of the latent image. The outer protective layer may prevent contact between the inner material and the contents of the cells, which may be useful if the inner material and cell contents would otherwise begin to react with one another. Preferably, the thickness of this outer protective layer is low, for example between 0.1 and 10 micrometers. Preferably the modulus of the layer is low at the temperature of development, for example less than 200 Mpa.

According to a second aspect of the invention, there is provided a sealed cell structure comprising first and second substrates that are spaced apart by a plurality of partition walls, the plurality of partition walls defining a plurality of cells between the first and second substrates, there being photo-embossing material on at least one of:

the first substrate;
the second substrate; and
the plurality of partition walls;

wherein the photo-embossing material has been displaced, by the writing and developing of a latent image, so as to seal the cells apart from one another.

Embodiments of the invention will now be described, by way of example only, and with reference to the accompanying drawings, in which.

Same or similar reference signs denote same or similar features in the Figures.

Figure 1A:
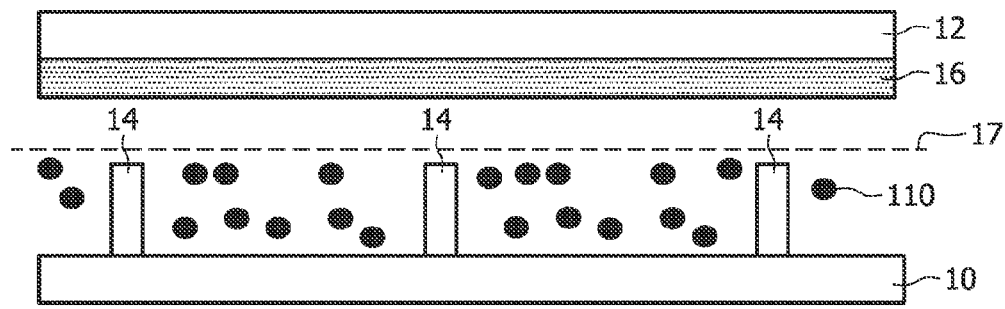
FIG. 1 shows schematic diagrams of a method for forming a sealed cell structure according a first embodiment of the invention.
Figure 1B:
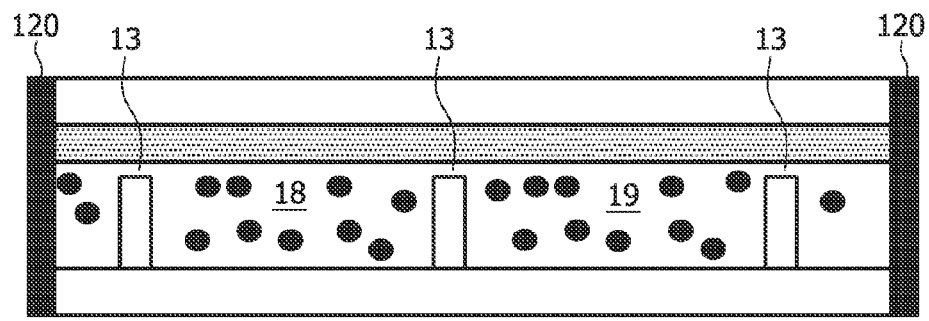
Figure 1C:
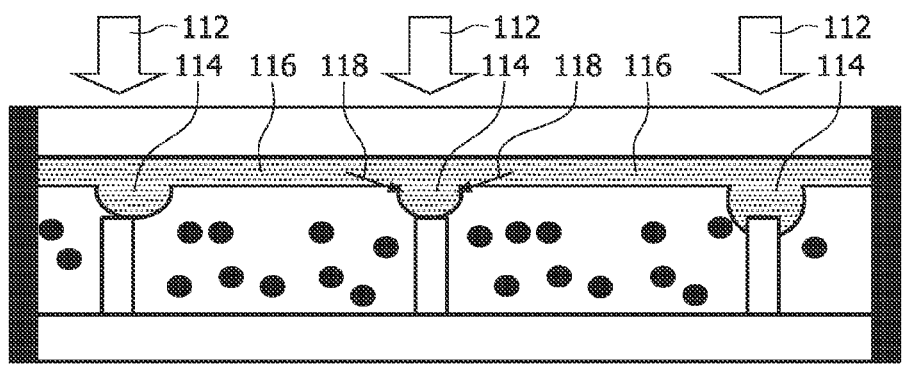

The first embodiment of the invention will now be described with reference to FIG. 1. FIG. 1 shows three cross-sectional diagrams of the creation of a sealed cell structure, each diagram showing a step in the creation process.

At step A, a first substrate 10 having a plurality of partition walls 14 is formed. The cell areas between the partition walls are filled with an electrophoretic fluid 17 comprising multiple charged pigmented particles 110, which may be moved under the influence of electric fields to generate various display effects.

A second substrate 12 having a layer 16 of photo-embossing material is also formed.

The first and second substrates are formed of glass, although alternative materials such as plastics or could also be used to form at least one of the substrates as will be apparent to the skilled reader. For electrophoretic display applications, at least one of the substrates should be transparent/translucent to achieve the display effect. To form a transmissive display, both of the substrates should be transparent/translucent so that light can travel through the cells and be modulated by the charged pigmented electrophoretic particles. To form a transflective display, the first substrate may have a reflective coating and the second substrate may be transparent/translucent, such that light can enter the cells through the second substrate, and be reflected back from the first substrate. However for other applications, such chemical packaging, both of the substrates may be opaque. Examples of chemical packaging applications are drug delivery systems, fragrance delivery systems, chemical reagent delivery systems, biochips or other micro-fluidic devices.

The partition walls are formed of photo-resist material, such as SU-8, which is a multifunctional epoxide that can be structured by masked photocuring following a cationic polymerization mechanism, where the unexposed areas are removed by a solvent. Many other methods of forming the partition walls will also be apparent to those skilled in the art. For example, the walls may be fabricated separately from the first substrate and then attached (e.g. glued) to the first substrate afterwards. The walls may also be formed by embossing them into the substrate, for example if the first substrate is formed of a deformable material, then a stamp could be used to displace the substrate material to form the partition walls.

The photo-embossing material is formed of a mixture of a polymer (polybenzylmethacrylate), a monomer (pentaerythritoltetraacrylate), a photoinitiator (benzil dimethylketal), and a thermal initiator (benzoylperoxide). Many possible alternatives exist for the composition of the photo-embossing material. The basic ingredients are a polymer material, a monomer or a monomer mixture, and a photoinitiator. Well-studied polymers are polymethylmethacrylate, polymethylacrylate, polystyrene, polyethylmethacrylate polybenzylmethacrylate, and polyisobornylmethacrylate, although many other polymers may be used as well.

The material also contains a monomeric compound, being a compound of relatively low molecular weight, i.e. smaller than 1500, that polymerizes upon contact with reactive particles, i.e. free radicals or cationic particles. In a preferred embodiment, the monomer or one of the monomers of a monomer mixture contains more than one polymerizing group, so that upon polymerization a polymer network is formed. Furthermore, in the preferred embodiment, the monomers are molecules containing a reactive group of the following classes: vinyl, acrylate, methacrylate, epoxide, vinylether or thiol-ene. The material also contains a photosensitive component, which upon exposure to actinic radiation generates the reactive particles, i.e. the free-radicals or cationic particles.

Examples of monomers suitable for use as a polymerizing ingredient, and having at least two crosslinkable groups per molecule, include monomers containing (meth)acryloyl groups such as trimethylolpropane tri(meth)acrylate, pentaerythritol tri(meth)acrylate, dipentaerythritol hexa(meth)acrylate ethylene glycol di(meth)acrylate, tetraethylene glycol di(meth)acrylate, polyethylene glycol di(meth)acrylate, 1,4-butanediol di(meth)acrylate, 1,6-hexanediol di(meth)acrylate, neopentyl glycol di(meth)acrylate, polybutanediol di(meth)acrylate, tripropyleneglycol di(meth)acrylate, glycerol tri(meth)acrylate, phosphoric acid mono- and di(meth)acrylates, $C_7$-$C_{20}$ alkyl di(meth)acrylates, trimethylolpropanetrioxyethyl(meth)acrylate, tris(2-hydroxyethyl) isocyanurate tri(meth)acrylate, tris(2-hydroxyethyl) isocyanurate di(meth)acrylate, pentaerythritol tri(meth)acrylate, pentaerythritol tetra(meth)acrylate, dipentaerythritol monohydroxy pentacrylate, dipentaerythritol hexacrylate, tricyclodecane diyl dimethyl di(meth)acrylate, and alkoxylated versions, preferably ethoxylated and/or propoxylated, of any of the preceding monomers, and also di(meth)acrylate of a diol which is an ethylene oxide or propylene oxide adduct to bisphenol A, di(meth)acrylate of a diol which is an ethylene oxide or propylene oxide adduct to hydrogenated bisphenol A, epoxy(meth)acrylate which is a (meth)acrylate adduct to bisphenol A of diglycidyl ether, diacrylate of polyoxyalkylated bisphenol A, and triethylene glycol divinyl ether, adduct of hydroxyethyl acrylate, isophorone diisocyanate and hydroxyethyl acrylate (HIH), adduct of hydroxyethyl acrylate, toluene diisocyanate and hydroxyethyl acrylate (HTH), and amide ester acrylate.

Examples of suitable monomers having only one crosslinking group per molecule include monomers containing a vinyl group, such as N-vinyl pyrrolidone, N-vinyl caprolactam, vinyl imidazole, vinyl pyridine; isobornyl (meth)acrylate, bornyl(meth)acrylate, tricyclodecanyl(meth) acrylate, dicyclopentanyl(meth)acrylate, dicyclopentenyl (meth)acrylate, cyclohexyl(meth)acrylate, benzyl(meth) acrylate, 4-butylcyclohexyl(meth)acrylate, acryloyl morpholine, (meth)acrylic acid, 2-hydroxyethyl(meth)acrylate, 2-hydroxypropyl(meth)acrylate, 2-hydroxybutyl(meth) acrylate, methyl(meth)acrylate, ethyl(meth)acrylate, propyl (meth)acrylate, isopropyl(meth)acrylate, butyl(meth) acrylate, amyl(meth)acrylate, isobutyl(meth)acrylate, t-butyl (meth)acrylate, pentyl(meth)acrylate, caprolactone acrylate, isoamyl(meth)acrylate, hexyl(meth)acrylate, heptyl(meth) acrylate, octyl (meth)acrylate, isooctyl(meth)acrylate, 2-ethylhexyl(meth)acrylate, nonyl(meth)acrylate, decyl(meth) acrylate, isodecyl(meth)acrylate, tridecyl(meth)acrylate, undecyl(meth)acrylate, lauryl(meth)acrylate, stearyl(meth) acrylate, isostearyl(meth)acrylate, tetrahydrofurfuryl(meth) acrylate, butoxyethyl(meth)acrylate, ethoxydiethylene glycol(meth)acrylate, benzyl(meth)acrylate, phenoxyethyl (meth)acrylate, polyethylene glycol mono(meth)acrylate, polypropylene glycol mono(meth)acrylate, methoxyethylene glycol(meth)acrylate, ethoxyethyl(meth)acrylate, methoxypolyethylene glycol(meth)acrylate, methoxypolypropylene glycol(meth)acrylate, diacetone(meth)acrylamide, beta-carboxyethyl(meth)acrylate, phthalic acid(meth)acrylate, isobutoxymethyl(meth)acrylamide, N,N-dimethyl(meth)acrylamide, t-octyl(meth)acrylamide, dimethylaminoethyl(meth) acrylate, diethylaminoethyl(meth)acrylate, butylcarbamylethyl(meth)acrylate, n-isopropyl(meth)acrylamide fluorinated(meth)acrylate, 7-amino-3,7-dimethyloctyl(meth)acrylate, N,N-diethyl(meth)acrylamide, N,N-dimethylaminopropyl(meth)acrylamide, hydroxybutyl vinyl ether, lauryl vinyl ether, cetyl vinyl ether, 2-ethylhexyl vinyl ether; and compounds represented by the following formula (I)

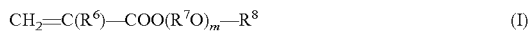

$$CH_2=C(R^6)—COO(R^7O)_m—R^8 \quad (I)$$

wherein $R^6$ is a hydrogen atom or a methyl group; $R^7$ is an alkylene group containing 2 to 8, preferably 2 to 5 carbon atoms; and m is an integer from 0 to 12, and preferably from 1 to 8; $R^8$ is a hydrogen atom or an alkyl group containing 1 to 12, preferably 1 to 9, carbon atoms; or, $R^8$ is a tetrahydrofuran group-comprising alkyl group with 4-20 carbon atoms, optionally substituted with alkyl groups with 1-2 carbon atoms; or $R^8$ is a dioxane group-comprising alkyl group with 4-20 carbon atoms, optionally substituted with methyl groups; or $R^8$ is an aromatic group, optionally substituted with $C_1$-$C_{12}$ alkyl group, preferably a $C_8$-$C_9$ alkyl group, and alkoxylated aliphatic monofunctional monomers, such as ethoxylated isodecyl(meth)acrylate, ethoxylated lauryl (meth)acrylate, and the like.

An initiator may be present in the material to initiate the crosslinking reaction. The amount of initiator may vary between wide ranges. A suitable amount of initiator is for example between above 0 and 5 wt % with respect to total weight of the compounds that take part in the crosslinking reaction.

When UV-crosslinking is used to initiate the crosslinking, the material preferably comprises a UV-photo-initiator. A photo-initiator is capable of initiating a crosslinking reaction upon absorption of light; thus, UV-photo-initiators absorb light in the Ultra-Violet region of the spectrum. Some well-known examples of UV-photo-initiators that provide good results are 2,2-Dimethoxy-1,2-diphenylethan-1-one (IRGACURE® 651—Ciba Specialty Chemicals), 2-Benzyl-2-dimethylamino-1-(4-morpholinophenyl)-butanone-1 (IRGACURE® 369—Ciba Specialty Chemicals), Bis(2,4,6-trimethylbenzoyl)-phenylphosphineoxide (Irgacure® 819—Ciba Specialty Chemicals).

Preferably, the polymerization initiator comprises a mixture of a photo initiator and a thermal initiator. Examples of thermal initiators are benzoyl peroxide, dicumyl peroxide, 2,5-dimethyl-2,5-di(tert-butyl peroxide)hexane peroxide, dilauroyl peroxide and 2,2'-azobisisobutyronitrile.

Preferably, the material contains an inhibitor retarding polymerization in the unexposed areas. Examples of inhibitors that have been studied are hydroquinone and hydroquinone mono methyl ether. In a preferred embodiment, the amount of inhibitor is between 0.001 and 0.5 wt %.

The material may be created from a solution of an organic solvent. The ratio between the polymer and the monomer or monomer mixture is chosen such that after evaporation of the solvent the film that is formed is solid and preferably tack free. The ratio between the polymer (P) and the monomer (M) as defined by P/(P+M) is preferably greater than 0.3 and even more preferably greater or equal to 0.5.

Preferably, the solvent used is evaporated after applying a coating of the solution to at least one of the substrates or the partition walls. The coating may optionally be heated or treated in vacuum to aid evaporation of the solvent.

Examples of suitable solvents are 1,4-dioxane, acetone, acetonitrile, chloroform, chlorophenol, cyclohexane, cyclohexanone, cyclopentanone, dichloromethane, diethyl acetate, diethyl ketone, dimethyl carbonate, dimethylformamide, dimethylsulphoxide, ethanol, ethyl acetate, m-cresol, mono- and di-alkyl substituted glycols, N,N-dimethylacetamide, p-chlorophenol, 1,2-propanediol, 1-pentanol, 1-propanol, 2-hexanone, 2-methoxyethanol, 2-methyl-2-propanol, 2-octanone, 2-propanol, 3-pentanone, 4-methyl-2-pentanone, hexafluoroisopropanol, methanol, methyl acetate, butyl acetate, methyl acetoacetate, methyl ethyl ketone, methyl propyl ketone, n-methylpyrrolidone-2, n-pentyl acetate, phenol, tetrafluoro-n-propanol, tetrafluoroisopropanol, tetrahydrofuran, toluene, xylene and water. Alcohol, ketone and ester based solvents may also be used, although the solubility of acrylates may become an issue with high molecular weight alcohols. Halogenated solvents (such as dichloromethane and chloroform) and hydrocarbons (such as hexanes and cyclohexanes), may also be suitable.

The photo-embossing material is applied to the second substrate from a solution by casting, to form a substantially uniform layer 16 of around 10 um thickness on the second substrate. Alternatively, the thickness of the layer 16 of photo-embossing material may vary according to the material's properties and according to the amount of expansion required when the latent image is written and developed. Furthermore, other techniques such as doctor blading or printing may be used to apply the photo-embossing material to the second substrate.

At step B, the first and second substrates are spaced apart by the partition walls by resting the second substrate 12 on top of the partition walls 14, helping to form cells 18 and 19. Un-intentional gaps 13 commonly occur between the second substrate and the tops of some of the partition walls when the second substrate 12 does not properly rest on the partition walls 14. These gaps may for example be due to varying partition wall height, or they may be due to excess fluids or materials within the cells forming a thin layer between the tops of the partition walls and the second substrate. The size of the gaps 13 as drawn in the Figures are not to scale, and in practice may be much smaller than shown. The substrates 10 and 12 are fixed in alignment with one another, by sealing the edges of the substrates together with sealing material 120.

Alternatively, the substrates may be fixed in alignment by for example pressing them both against the partition walls (i.e. by friction), or by using a jig to hold the substrates in position.

At step C, a latent image is written and developed in the photo-embossing material to seal the cells apart from one another. The development of the latent image causes photo-embossing material to be displaced in the direction of arrows 118, thereby causing the areas 114 of the photo-embossing material to expand, and the areas 116 of the photo-embossing to shrink. Since the areas 114 are at the interfaces between the partition walls 14 and the second substrate 12, the expansion of the photo-embossing material 16 at the areas 114 causes the photo-embossing material to contact the tops of the partition walls 14, closing the gaps 13, and thereby sealing the cells apart from one another.

The writing of the latent image comprises exposing 112 to ultra violet light the areas 114 of the photo-embossing material that are to expand to seal the cells apart from one another. This exposure causes formation of reactive particles (e.g. free radicals) due to photo-dissociation of the photo-initiator. The ultra-violet light is exposed to the photo-embossing material though a mask, so that the areas 116 of photo-embossing material that are not required to expand are not exposed. Alternatively, the photo-embossing material may be exposed to other types of photo-embossing material property altering (actinic) light. For example, an Argon laser light emitting at 351 nm wavelength may be used to write the latent image, in which case no mask may be required since the direction of the laser may be accurately controlled.

In a further alternative, the electrophoretic fluid may comprise particles for absorbing the light that is used to write the latent image. Then, if the actinic light is directed to the photo-embossing material from the direction of the first substrate 10 rather than from the direction of the second substrate 12, then the electrophoretic fluid itself may act as a mask for patterning the actinic light. For example, actinic light may be able to reach the areas of the photo-embossing material that are directly above the partition walls 14 by passing though the first substrate and partition walls, but may be blocked from reaching the other areas of the photo-embossing material by being absorbed by the absorbing particles in the electrophoretic fluid. Hence, the latent image becomes effectively self-aligning with respect to the partition walls.

The writing of the latent image occurs during step C, after the first and second substrates have been spaced apart by the plurality of partition walls in step B. Hence, the first substrate or second substrate and partition walls should be translucent enough to UV light so as to allow the latent image to be written through them and into the photo-embossing material.

Alternatively, the latent image may be written before the first and second substrates are spaced apart by the partition walls, for example just after the photo-embossing material has been formed on the second substrate in step A.

An advantage of writing the latent image before the substrates have been spaced apart by the partition walls, is that the latent image does not have to be exposed though the first or second substrates, which may reduce the intensity of light required and/or improve the accuracy of the areas that are written. An advantage of writing the latent image after the first and second substrates have been spaced apart by the partition walls, is that the first and second substrates can be spaced apart without respect to the pattern of a previously written latent image.

The development of the latent image comprises heating the photo-embossing material by exposing it to infrared light. This heating causes the diffusional mobility of the monomer in the photo-embossing material to be enhanced, which induces polymerisation and diffusion of the monomer into the exposed areas of the latent image. This causes the exposed areas 114 to expand so as to seal the cells apart from one another, and causes the non-exposed areas 116 to shrink as the monomer diffuses away from them. The development of the latent image may comprise heating the photo-embossing material using other methods, for example by placing the cell structure in an oven.

The temperature of the photo-embossing material continues to be raised until it rises above the decomposition temperature of the thermal initiator, after which the remaining monomer both in the exposed and unexposed areas of the photo-embossing material becomes polymerised. This helps to prevent the photo-embossing material from changing its shape after the development stage has been completed. Alternatively, to simplify the manufacture of the photo-embossing material, the thermal initiator may not be included.

The writing and developing of the latent image can take place by exposing the photo-embossing material to both UV light (for writing the image) and IR light (for heating the material to develop the image) at the same time. Hence, development of the image can begin at the instant that the image is written. This minimises the length of time that is required to perform the writing and developing of the image.

Photo-embossing is a technique that is well known to those skilled in the art, and for a fuller description than that given herein, the reader is referred to:

C. WITZ, C. SANCHEZ, C BASTIAANSEN, D. J. BROER, HANDBOOK OF POLYMER REACTION ENGINEERING, VOL. 2 (EDS. T. MEYER, J. KEURENTJES), WILEY-VCH, WEINHEIM, GERMANY 2005, CH 19.

Figure 2A:
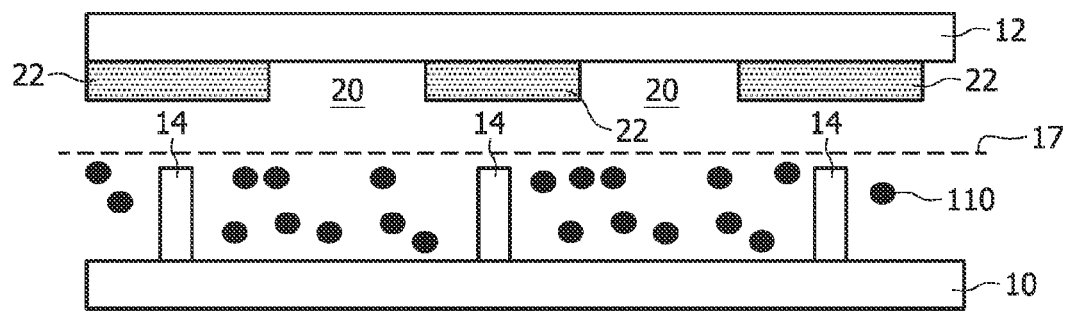
FIG. 2 shows schematic diagrams of a method for forming a sealed cell structure according a second embodiment of the invention.
Figure 2B:
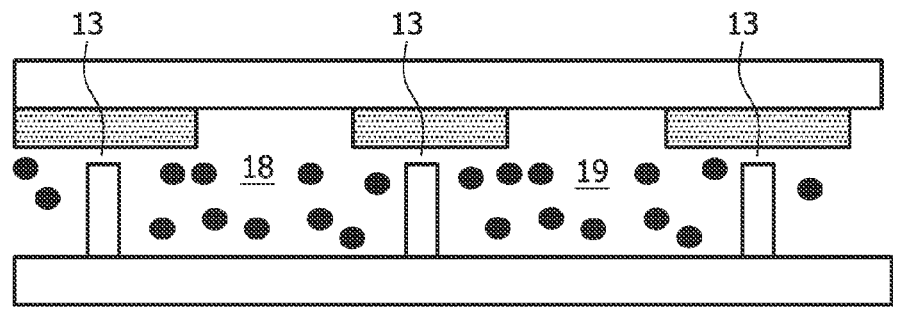
Figure 2C:
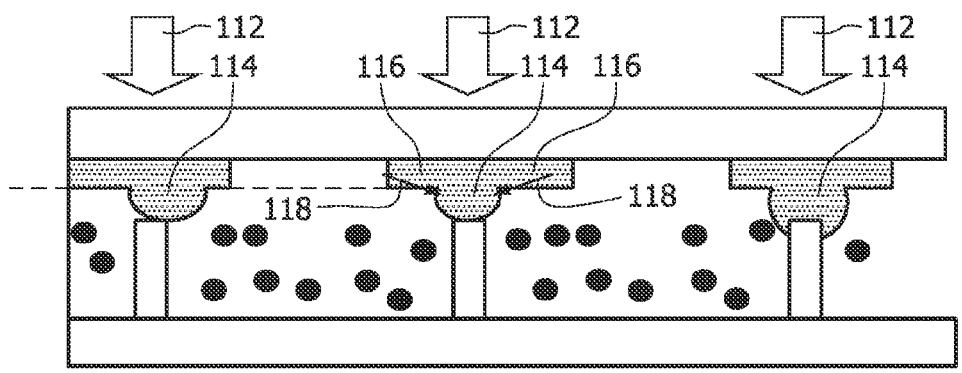

The second embodiment of the invention will now be described with reference to FIG. 2. Much of the description in relation to the first embodiment can equally be applied to the second embodiment, and so it is not repeated again. FIG. 2 shows three cross-sectional diagrams of the creation of a sealed cell structure, each diagram showing a step in the creation process.

At step A, a first substrate 10 having a plurality of partition walls 14 is formed. The cell areas between the partition walls are filled with an electrophoretic fluid 17 comprising multiple charged pigmented particles 110. A second substrate 12 having areas 22 of photo-embossing material is also formed. The areas 22 of photo-embossing material are formed within the regions of the intended interfaces between the second substrate 12 and the partition walls 14. The areas 22 of photo-embossing material are formed by forming a substantially uniform layer of photo-embossing material on the substrate, and then by etching away the areas 20 until only the areas 22 remain, although other alternatives such as printing will be apparent to those skilled in the art.

At step B, the second substrate is aligned over the partition walls so the areas 22 of photo-embossing material are in the regions of the interfaces to the partition walls. Un-intentional gaps 13 exist between some of the partition walls and the second substrate.

At step C, the latent image is written and developed, causing diffusion of the photo-embossing material in the direction of arrows 118, thereby expanding the areas 114 to contact the partition walls 14, and shrinking the areas 116, and hence sealing the cells apart from one another.

Figure 3A:
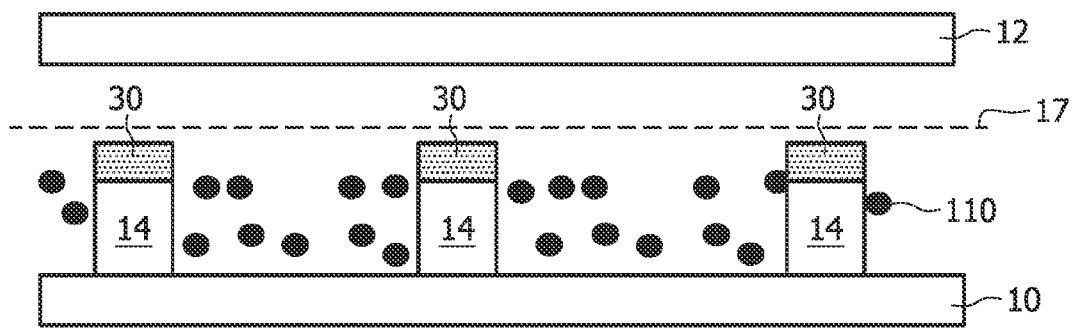
FIG. 3 shows schematic diagrams of a method for forming a sealed cell structure according a third embodiment of the invention.
Figure 3B:
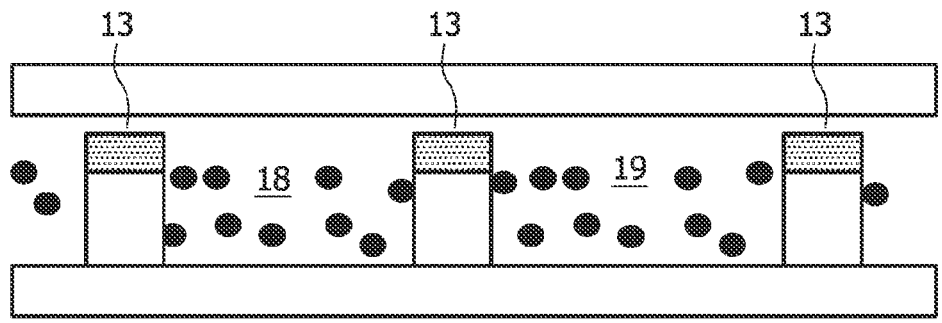
Figure 3C:
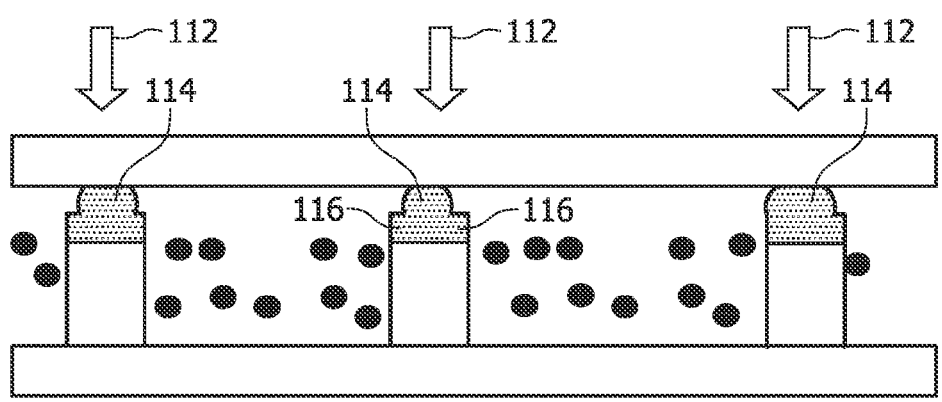

The third embodiment of the invention will now be described with reference to FIG. 3. Much of the description in relation to the first embodiment can equally be applied to the third embodiment, and so it is not repeated again. FIG. 3 shows three cross-sectional diagrams of the creation of a sealed cell structure, each diagram showing a step in the creation process.

At step A, a first substrate 10 having a plurality of partition walls 14 is formed. The cell areas between the partition walls are filled with an electrophoretic fluid 17 comprising multiple charged pigmented particles 110. A second substrate 12 is also formed. Areas 30 of photo-embossing material are formed on the partition walls, and within the regions of the partition walls that are intended to form the interfaces between the partition walls and the second substrate. In this embodiment, the areas 30 are formed by a process that shows correspondence with transfer printing or flexoprinting. A bath holds a photo-embossing solution that comprises polymer, monomer(s), initiator, inhibitor and solvent(s), and one or more rollers collect solution from the bath and deposit a layer of the solution onto the tops of the partition walls. A drying step at 70° C. removes the solvent(s).

At step B, the second substrate is laid over the partition walls, helping to form cells 18 and 19. Un-intentional gaps 13 exist between some of the partition walls and the second substrate.

At step C, the latent image is written and developed, causing diffusion of the photo-embossing material from areas 116 to areas 114, thereby expanding the areas 114 to contact the second substrate 12, and shrinking the areas 116, and hence sealing the cells apart from one another. It is obviously important that a portion of the photo-embossing material 30 is not exposed to actinic light, so that there are non-exposed areas of photo-embossing material from which photo-embossing material can diffuse into exposed areas of photo-embossing material.

Figure 4A:
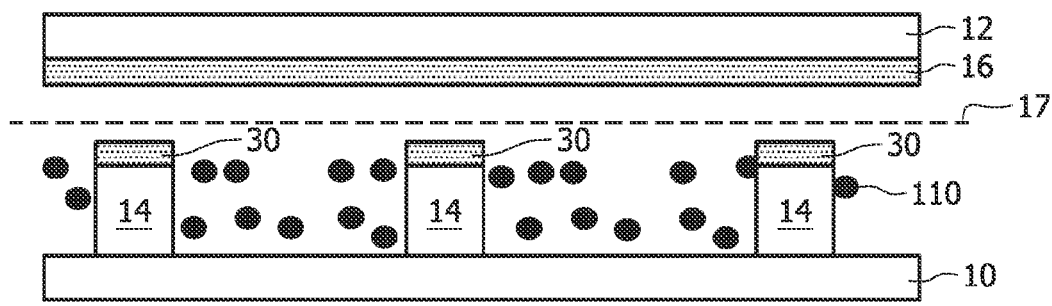
FIG. 4 shows schematic diagrams of a method for forming a sealed cell structure according a fourth embodiment of the invention.
Figure 4B:
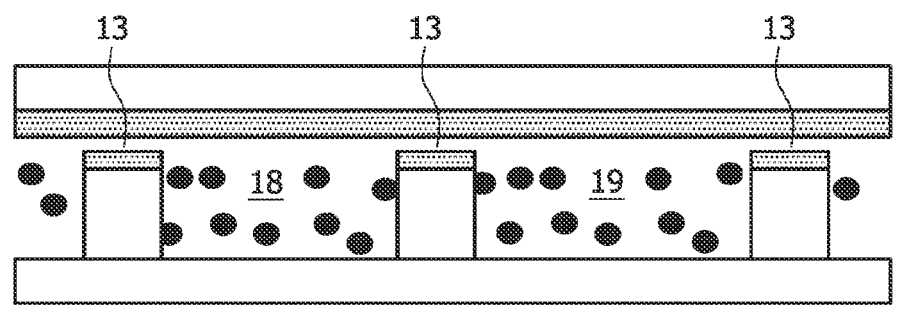
Figure 4C:
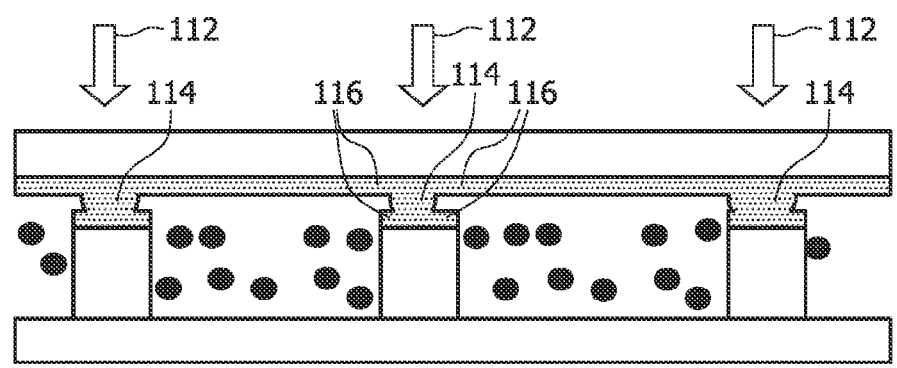

The fourth embodiment of the invention will now be described with reference to FIG. 4. Much of the description in relation to the first embodiment can equally be applied to the fourth embodiment, and so it is not repeated again. FIG. 4 shows three cross-sectional diagrams of the creation of a sealed cell structure, each diagram showing a step in the creation process.

At step A, a first substrate 10 having a plurality of partition walls 14 is formed. The cell areas between the partition walls are filled with an electrophoretic fluid 17 comprising multiple charged pigmented particles 110. A second substrate 12 having a layer of photo-embossing material 16 is also formed. Areas 30 of photo-embossing material are formed on the partition walls, and within the regions of the partition walls that are intended to form the interfaces between the partition walls and the second substrate.

At step B, the second substrate is laid over the partition walls, helping to form cells 18 and 19. Un-intentional gaps 13 exist between some of the partition walls and the second substrate.

At step C, the latent image is written and developed on both the photo-embossing material on the second substrate and on the partition walls, causing diffusion of the photo-embossing material from areas 116 to areas 114, thereby expanding the areas 114 and shrinking the areas 116, and sealing the cells apart from one another. Since the photo-embossing material on the second substrate and the photo-embossing material on the partition walls both expand towards one another, a larger gap between the partition walls and the second substrate may be filled. Furthermore, a stronger seal may be formed, since the photo-embossing material forms the seal by contacting other photo-embossing material, rather than by contacting a substrate or partition wall of a different material to the photo-embossing material.

Figure 5A:
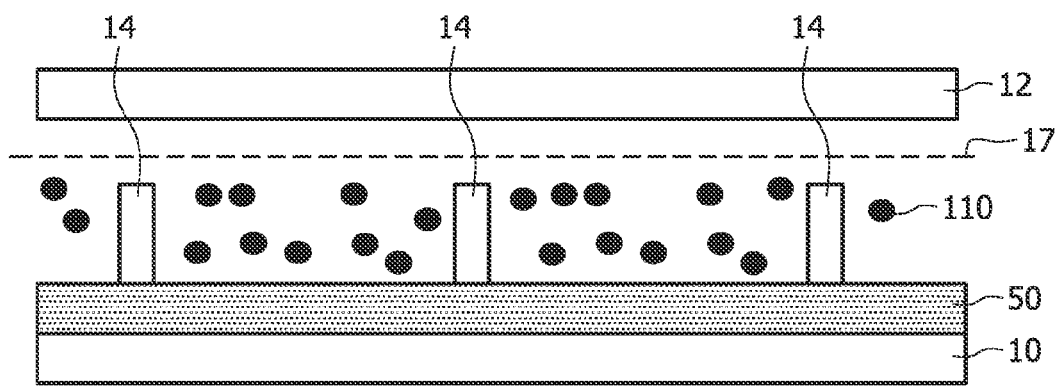
FIG. 5 shows schematic diagrams of a method for forming a sealed cell structure according a fifth embodiment of the invention.
Figure 5B:
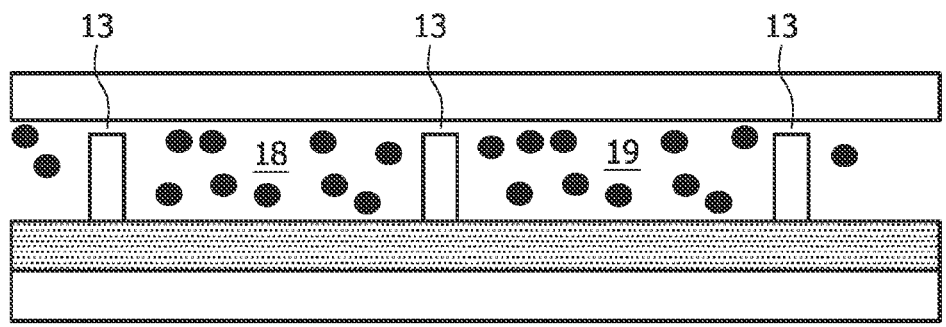
Figure 5C:
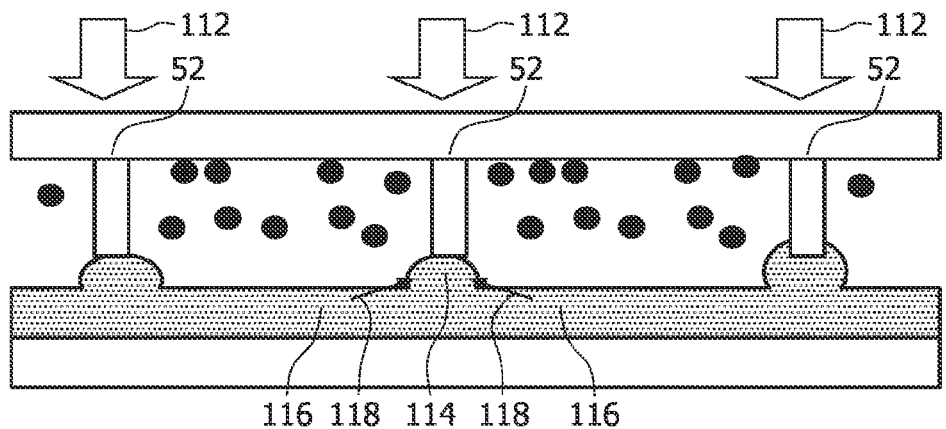

The fifth embodiment of the invention will now be described with reference to FIG. 5. Much of the description in relation to the first embodiment can equally be applied to the fifth embodiment, and so it is not repeated again. FIG. 5 shows three cross-sectional diagrams of the creation of a sealed cell structure, each diagram showing a step in the creation process.

At step A, a first substrate 10 having a layer of photo-embossing material 50 and a plurality of partition walls 14 is formed. The cell areas between the partition walls are filled with an electrophoretic fluid 17 comprising multiple charged pigmented particles 110. A second substrate 12 is also formed.

At step B, the second substrate is laid over the partition walls, helping to form cells 18 and 19. Un-intentional gaps 13 exist between some of the partition walls and the second substrate.

At step C, the latent image is written and developed on the photo-embossing material on the first substrate, causing diffusion of the photo-embossing material in the direction of the arrows 118, thereby expanding the areas 114 and shrinking the areas 116. The expansion of areas 114 causes the partition walls to be displaced towards and contact the second substrate 12, thereby sealing the cells apart from one another at interfaces 52. This has the advantage that the formation of both the photo-embossing material and partition walls is performed on the first substrate, so that the second substrate does not have to be processed.

Figure 6:
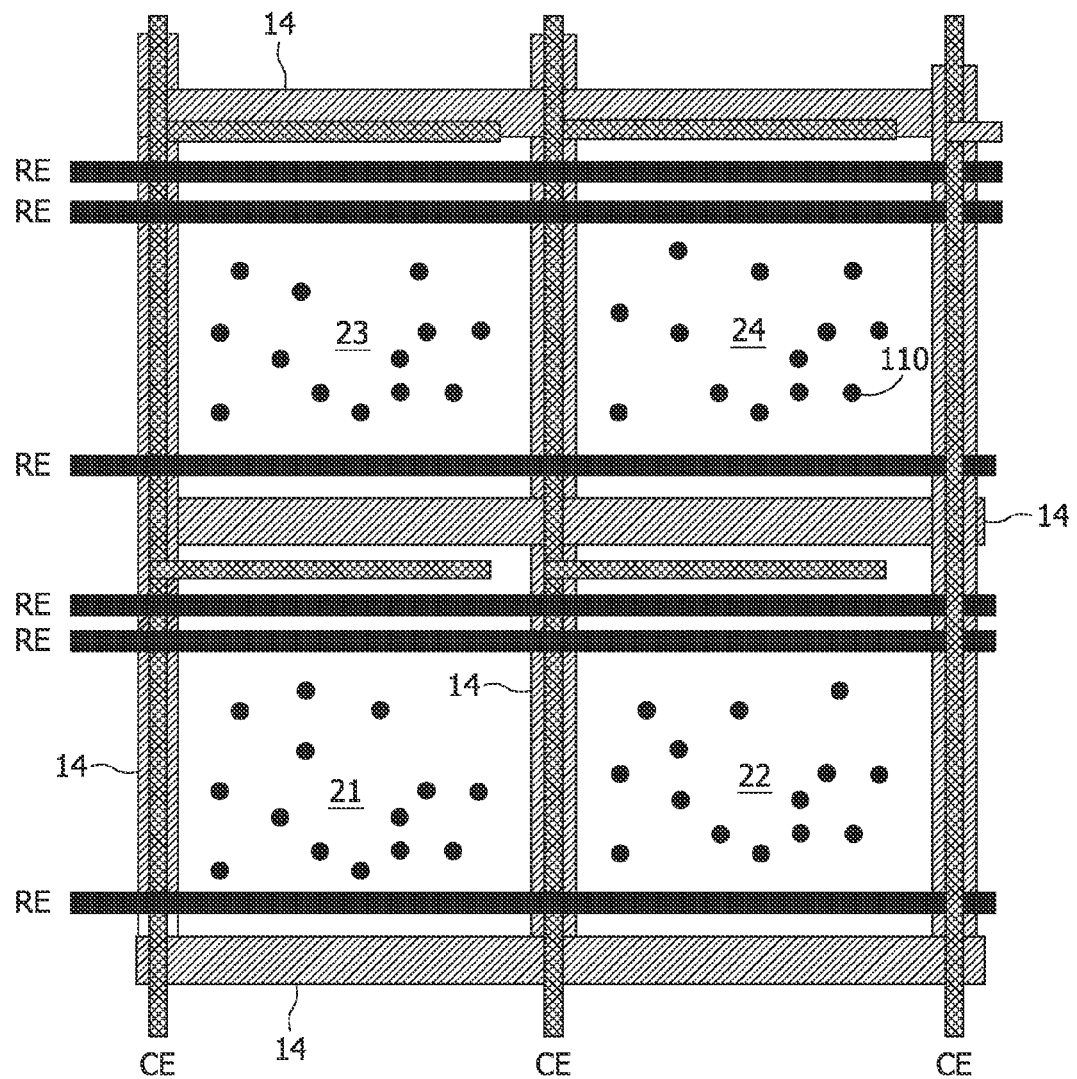
FIG. 6 shows a plan schematic diagram of a portion of an electrophoretic display, comprising pixel cells having been sealed using a method according to the invention.

FIG. 6 shows a plan schematic diagram of a portion of an in-plane electrophoretic display, comprising four in-plane display pixels formed from four respective cells 21, 22, 23, and 24. The cells are formed by two substrates (not shown for clarity) that are spaced apart by partition walls 14, the cells having been sealed apart from one another by displacement of photo-embossing material from non-exposed to exposed areas. The display device comprises multiple row RE and column CE electrodes for controlling the movements of the charged particles 110 within each pixel cell.

The sealed cell structure of the invention has been described in relation to electrophoretic displays, although it may also find applications in a wide variety of systems, for example:

biosensors used for molecular diagnostics; rapid and sensitive detection of proteins and nucleic acids in complex biological mixtures—such as e.g. blood or saliva;

electrolysis to create a local pH variation for cell lysing or protein manipulation;

high throughput screening devices for chemistry, pharmaceuticals or molecular biology;

testing devices e.g. for DNA or proteins e.g. in criminology, for on-site testing (in a hospital), for diagnostics in centralized laboratories or in scientific research;

tools for DNA or protein diagnostics for cardiology, infectious disease and oncology, food, and environmental diagnostics;

tools for combinatorial chemistry; or analysis devices.

As will be appreciated by those skilled in the art, the material in the sealed cells may comprise a wide variety of substances, for example, bodily fluids (e.g. blood, urine, semen etc.) of virtually any organism; environmental samples (e.g. air, agricultural, water and soil samples); biological agent samples; research samples (e.g. nucleic acids). Applications of the present invention include devices for the detection of one or more target molecules in a fluid sample, especially to the field of devices for the detection of biomolecules in aqueous solution. The target molecule(s) may for example be the product(s) of an amplification reaction, including both target and signal amplification; purified samples, such as purified genomic DNA, RNA, proteins, etc.; raw samples (bacteria, virus, genomic DNA, etc.); biological molecular compounds such as, but not limited to, nucleic acids and related compounds (e.g. DNAs, RNAs, oligonucleotides or analogs thereof, PCR products, genomic DNA, bacterial artificial chromosomes, plasmids), proteins and related compounds (e.g. polypeptides, peptides, monoclonal or polyclonal antibodies, soluble or bound receptors, transcription factors), antigens, ligands, haptens, carbohydrates and related compounds (e.g. polysaccharides, oligosaccharides), cellular fragments such as membrane fragments, cellular organelles, intact cells, bacteria, viruses, protozoa.

In summary, there is provided a method for forming a sealed cell structure. The sealed cell structure comprises first and second substrates that are spaced apart by a plurality of partition walls. The partition walls define a plurality of cells between the first and second substrates. At least one of the substrates and the partition walls have a layer of photo-embossing material on them. A latent image is written onto the photo-embossing material, and then the image is developed, thereby causing expansion of the photo-embossing material in the areas according to the pattern of the latent image. The expansion of the photo-embossing material causes the cells to be sealed apart from one another.

Numerous other embodiments falling within the scope of the appended claims will also be apparent to those skilled in the art. There are many possible variations on the areas of the substrates and/or partition walls on which the photo-embossing material may be placed, as will be apparent to those skilled in the art. For example, photo-embossing material may be formed on both of the first and second substrates. The order of the method steps recited in the claims may be different for different embodiments. Reference signs in the claims are not to be construed so as to limit the scope of the claims.

The invention claimed is:

1. A method for forming a sealed cell structure, the sealed cell structure comprising first and second substrates and a plurality of partition walls, the method comprising:
    applying photo-embossing material on at least one of:
        the first substrate;
        the second substrate; and
        the plurality of partition walls;
    spacing the first and second substrates apart by the plurality of partition walls, thereby defining a plurality of cells between the first and second substrates;
    writing a latent image into the photo-embossing material; and
    developing the latent image, causing the photo-embossing material to expand and be displaced so as to seal the cells apart from one another.

2. A method according to claim 1, further comprising filling the cells with fluid prior to sealing them apart from one another.

3. A method according to claim 2, wherein the fluid is an electrophoretic fluid, and wherein the cells form pixels of an electrophoretic display.

4. A method according to claim 1, wherein writing the latent image comprises exposing one or more areas of the photo-embossing material to actinic light.

5. A method according to claim 1, wherein developing the latent image comprises heating the photo-embossing material.

6. A method according to claim 1, wherein the photo-embossing material comprises a polymer, a monomer, and a photo-initiator.

7. A method according to claim 6, wherein writing the latent image comprises exposing areas of the photo-embossing material to actinic light, and wherein developing the latent image comprises heating the photo-embossing material, causing displacement of the monomer to the exposed areas, thereby expanding the exposed areas to seal the cells apart from one another.

8. A method according to claim 7, wherein the photo-embossing material further comprises a thermal initiator, and wherein developing the photo-embossing material comprises heating the photo-embossing material above the decomposition temperature of the thermal initiator, thereby polymerising the monomer.

9. A method according to claim 1, wherein the writing the latent image is performed after the spacing the first and second substrates apart from one another by the partition walls.

10. A method according to claim 9, wherein the latent image is written by exposing areas of the photo-embossing material to actinic light, wherein the cells are filled with a fluid comprising particles that absorb the actinic light, and wherein the absorbing particles act as a mask that at least partially defines the pattern of the latent image that is written onto the photo-embossing material.

11. A method according to claim 1, wherein the spacing the first and second substrates apart by a plurality of partition walls comprises:
    forming the partition walls on the first substrate; and
    laying the second substrate on the partition walls.

12. A method according to claim 1, wherein the photo-embossing material is formed as a layer on at least one of the first and second substrates, and wherein the writing and the developing of the latent image causes the photo-embossing material to be displaced so as to contact the partition walls, thereby sealing the cells apart from one another.

13. A method according to claim 1, wherein the photo-embossing material is formed:
    on at least one of the first and second substrates; and
    within the regions of the interfaces between the partition walls and the at least one of the first and second substrates; and
    wherein the writing and the developing of the latent image causes the photo-embossing material to be displaced so as to contact the partition walls, thereby sealing the cells apart from one another.

14. A method according to claim 1, wherein the photo-embossing material is formed:
    on the partition walls; and
    within the regions of the interfaces between the partition walls and at least one of the first and second substrates; and
    wherein the writing and the developing of the latent image causes the photo-embossing material to be displaced so as to contact the at least one of the first and second substrates, thereby sealing the cells apart from one another.

15. A method according to claim 1, wherein the spacing the first and second substrates apart by a plurality of partition walls comprises:
    forming the partition walls on the first substrate; and
    laying the second substrate on the partition walls; and
    wherein prior to the laying the second substrate on the partition walls, the photo-embossing material is formed:
    on the second substrate, and
    on the partition walls, within the regions of the partition walls that will form the interfaces between the partition walls and the second substrate; and wherein the writing and the developing of the latent image causes:

the photo-embossing material on the second substrate to be displaced towards the partition walls; and the photo-embossing material on the partition walls to be displaced towards the second substrate;

such that the photo-embossing material on the second substrate contacts the photo-embossing material on the partition walls, thereby sealing the cells apart from one another.

16. A method according to claim 12, wherein the spacing the first and second substrates apart by a plurality of partition walls comprises:

forming the partition walls on the first substrate; and laying the second substrate on the partition walls; and wherein the photo-embossing material is formed on the second substrate prior to laying the second substrate over the partition walls, and wherein the writing and developing of the latent image causes the photo-embossing material on the second substrate to be displaced so as to expand towards and to contact the plurality of partition walls, thereby sealing the cells apart from one another.

17. A method according to claim 12, wherein the spacing the first and second substrates apart by a plurality of partition walls comprises:

forming the partition walls on the first substrate; and laying the second substrate on the partition walls; and wherein the photo-embossing material is formed on the first substrate prior to forming the partition walls on the first substrate, and wherein the writing and developing of the latent image causes the photo-embossing material on the first substrate to be displaced so as to press against the plurality of partition walls, thereby displacing the plurality of partition walls so as to contact them against the second substrate, and thereby sealing the cells apart from one another.

18. A method according to claim 14, wherein the spacing the first and second substrates apart by a plurality of partition walls comprises:

forming the partition walls on the first substrate; and laying the second substrate on the partition walls; and wherein the photo-embossing material is formed:

on the plurality of partition walls, prior to the laying the second substrate on the partition walls; and within the regions of the partition walls that will form the interfaces between the partition walls and the second substrate; and wherein the writing and developing of the latent image causes the photo-embossing material on the partition walls to be displaced so as to expand towards and to contact the second substrate, thereby sealing the cells apart from one another.

19. A method according to claim 1, wherein the cells of the sealed cell structure form pixels of an electrophoretic display.

20. A method according to claim 1, wherein the photo-embossing material comprises:

an inner material in which the latent image is written and developed; and an outer protective layer at the surface of the inner material, the outer protective layer being able to deform in accordance with the inner material during the development of the latent image.

* * * * *